US008678533B2

(12) United States Patent
Mantell

(10) Patent No.: US 8,678,533 B2
(45) Date of Patent: Mar. 25, 2014

(54) SYSTEM AND METHOD TO COMPENSATE FOR DEFECTIVE INKJETS IN AN INKJET IMAGING APPARATUS

(75) Inventor: David Allen Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 276 days.

(21) Appl. No.: 12/814,932

(22) Filed: Jun. 14, 2010

(65) Prior Publication Data

US 2011/0304665 A1 Dec. 15, 2011

(51) Int. Cl.

| | |
|---|---|
| ***B41J 29/38*** | (2006.01) |
| *B41J 29/393* | (2006.01) |
| *G06K 15/00* | (2006.01) |
| *G06F 3/12* | (2006.01) |
| *G06K 15/02* | (2006.01) |
| *H04N 1/46* | (2006.01) |

(52) U.S. Cl.

USPC ............. 347/14; 347/19; 358/1.14; 358/1.15; 358/1.7; 358/1.8; 358/504

(58) Field of Classification Search

USPC ......... 347/14, 19; 358/1.14, 1.5, 1.7, 1.8, 504

See application file for complete search history.

(56) References Cited

U.S. PATENT DOCUMENTS

| | | | | |
|---|---|---|---|---|
| 6,161,919 | A | 12/2000 | Klassen | |
| 6,259,821 | B1 | 7/2001 | Branciforte et al. | |
| 6,753,976 | B1 | 6/2004 | Torpey et al. | |
| 6,868,180 | B2 | 3/2005 | Akahori et al. | |
| 6,880,907 | B2 | 4/2005 | Tsai | |
| 7,338,144 | B2 * | 3/2008 | Mantell et al. | 347/19 |
| 7,422,299 | B2 * | 9/2008 | Mantell et al. | 347/14 |
| 2003/0053161 | A1 | 3/2003 | Li et al. | |
| 2003/0169442 | A1 | 9/2003 | Yokochi | |
| 2003/0218780 | A1 | 11/2003 | Braun et al. | |
| 2006/0007497 | A1 | 1/2006 | Yokochi | |
| 2006/0285131 | A1 | 12/2006 | Mantell et al. | |
| 2007/0273927 | A1 | 11/2007 | Misaizu et al. | |
| 2009/0315939 | A1 | 12/2009 | Mantell et al. | |

FOREIGN PATENT DOCUMENTS

JP 2006159547 A * 6/2006

* cited by examiner

*Primary Examiner* — Laura Martin
*Assistant Examiner* — Jeremy Bishop
(74) *Attorney, Agent, or Firm* — Maginot, Moore & Beck, LLP

(57) ABSTRACT

A method comprises selecting a first and second datum stored in an array of image data and corresponding to a first and second defective inkjet ejector, the second defective inkjet ejector being within a search pattern positioned about the first datum, modifying the search pattern positioned about the first datum in response to detection of the second datum being within the search pattern positioned about the first datum, identifying a third datum stored in the array of image data and being within the modified search pattern positioned about the first datum, the third datum corresponding to a first functional inkjet ejector, modifying the third datum with reference to the first datum, and operating the first functional inkjet ejector with reference to the modified third datum to compensate for the first defective inkjet ejector being unable to eject ink corresponding to the first datum.

15 Claims, 6 Drawing Sheets

INKJETS

| TIME | A | B | C | D | E | F | G | H |
|---|---|---|---|---|---|---|---|---|
| 0 | 15 | 9 | 3 | | | 4 | 10 | 16 |
| 1 | 13 | 7 | 1 | X | X | 2 | 8 | 14 |
| 2 | 17 | 11 | 5 | | | 6 | 12 | 18 |

500

208

FIG. 5

INKJETS

| TIME | A | B | C | D | E | F | G | H | I | J |
|---|---|---|---|---|---|---|---|---|---|---|
| 0 | 21 | 15 | 9 | 3 | | | 4 | 10 | 16 | 22 |
| 1 | 19 | 13 | 7 | 1 | X | X | 2 | 8 | 14 | 20 |
| 2 | 23 | 17 | 11 | 5 | | | 6 | 12 | 18 | 24 |

600

208

FIG. 6

SYSTEM AND METHOD TO COMPENSATE FOR DEFECTIVE INKJETS IN AN INKJET IMAGING APPARATUS

TECHNICAL FIELD

The present disclosure relates generally to inkjet imaging apparatus and, more particularly, to inkjet imaging apparatus that compensate for one or more defective inkjets.

BACKGROUND

Drop on demand inkjet technology for producing printed media has been employed in commercial products such as printers, plotters, and facsimile machines. Generally, an inkjet image is formed by selectively ejecting ink drops onto an image substrate from a plurality of drop generators or inkjets, which are arranged in a printhead or a printhead assembly. For example, the printhead assembly and the image substrate are moved relative to one another and the inkjets are controlled to eject ink drops at appropriate times. The timing of the inkjet activation is performed by a printhead controller, which generates firing signals. The inkjets eject ink in response to the firing signals. The image substrate may be an intermediate image member, such as a print drum or belt, from which the ink image is later transferred to a print medium, such as paper. The image substrate may also be a moving web of print medium or sheets of a print medium onto which the ink drops are directly ejected. The ink ejected from the inkjets may be liquid ink, such as aqueous, solvent, oil based, UV curable ink or the like, which is stored in containers installed in the printer. Alternatively, the ink may be loaded in a solid form and delivered to a melting device, which heats the solid ink to its melting temperature to generate liquid ink, which is supplied to a printhead.

During the operational life of an inkjet printer, inkjets in one or more of the printheads may become unable to eject ink in response to receiving a firing signal. The defective condition of the inkjet may temporarily persist so the inkjet becomes operational after one or more image printing cycles. In other cases, the inkjet may remain unable to eject ink until a purge cycle is performed. A purge cycle may successfully unclog inkjets so that they are able to eject ink once again. Execution of a purge cycle, however, requires the imaging apparatus to be taken out of its image generating mode. Thus, purge cycles affect the throughput rate of an imaging apparatus and are preferably performed during downtime.

Compensation methods have been developed that enable an imaging apparatus to generate images even though one or more inkjets in the imaging apparatus are unable to eject ink. These compensation methods cooperate with image rendering methods to control the generation of firing signals for inkjets in a printhead. Rendering refers to the processes that receive input image data values and generate output image values. The output image values are used to generate firing signals, which cause the inkjets of a printhead to eject ink onto the recording media. Once the output image values are generated, a compensation method may use information regarding defective inkjets detected in the printhead to identify the output image data values that correspond to one or more defective inkjets in the printhead. The compensation method then finds a neighboring or nearby output image data value that can be adjusted to compensate for the defective inkjet. Preferably, an increase in the amount of ink ejected near the defective inkjet may be achieved by replacing a zero or nearly zero output image value with the output image value that corresponds to the defective inkjet.

Previously known compensation methods are useful so long as the nearby inkjet(s) selected to compensate for the defective inkjet is itself functional. Complications arise when a compensation method attempts to compensate for a first defective inkjet by selecting an inkjet for compensating printing that is also defective. This problem is especially acute when the defective inkjets eject ink either intermittently or erratically. Furthermore, this issue is compounded during longer print jobs, because the number of defective inkjets tends to increase in relation to the length of the print job. Consequently, a continuing need remains in the art to develop methods and systems that effectively compensate for defective inkjets in inkjet imaging apparatus.

SUMMARY

A method for image correction compensates for at least one defective inkjet in a printer. The method comprises selecting a first datum stored in an array of image data, the first datum corresponding to a first defective inkjet ejector, detecting a second datum stored in the array of image data, the second datum corresponding to a second defective inkjet ejector and being within a search pattern positioned about the first datum, modifying the search pattern positioned about the first datum in response to detection of the second datum being within the search pattern positioned about the first datum, identifying a third datum stored in the array of image data and being within the modified search pattern positioned about the first datum, the third datum corresponding to a first functional inkjet ejector, modifying the third datum with reference to the first datum, and operating the first functional inkjet ejector with reference to the modified third datum to compensate for the first defective inkjet ejector being unable to eject ink corresponding to the first datum.

A printing system implements a method of image correction that compensates for at least one defective inkjet in a printer. The printing system includes an image data memory configured to store an array of image data, and a processor configured (i) to select a first datum stored in the array of image data, the first datum corresponding to a first defective inkjet ejector, (ii) to detect a second datum stored in the array of image data, the second datum corresponding to a second defective inkjet ejector and being within a search pattern positioned about the first datum, (iii) to modify the search pattern positioned about the first datum in response to detection of the second datum being within the search pattern positioned about the first datum, (iv) to identify a third datum stored in the array of image data and being within the modified search pattern positioned about the first datum, the third datum corresponding to a first functional inkjet ejector, (v) to modify the third datum with reference to the first datum, and (vi) to operate the first functional inkjet ejector with reference to the modified third datum to compensate for the first defective inkjet ejector being unable to eject ink corresponding to the first datum.

BRIEF DESCRIPTION OF THE DRAWINGS

The foregoing aspects and other features of an inkjet printing apparatus, which compensates for defective inkjets in a printhead are explained in the following description, taken in connection with the accompanying drawings.

FIG. 5 illustrates an example of a combined search pattern used to select image data positions available for defective inkjet ejector compensation for a first and second defective inkjet ejector.

FIG. 6 illustrates an example of a combined search pattern used to select image data positions available for defective inkjet ejector compensation for a first and second defective inkjet ejector.

DETAILED DESCRIPTION

Figure 1:
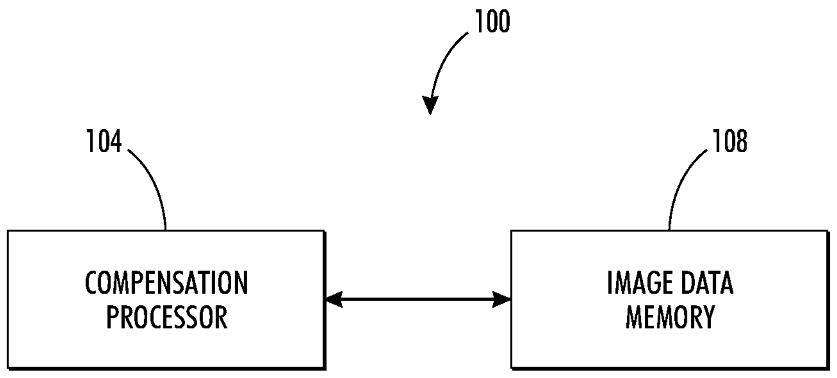
FIG. 1 illustrates a block diagram of a system that compensates for defective inkjets in an inkjet printing apparatus.

For a general understanding of the environment for the system and method disclosed herein and the details for the system and method, reference is made to the drawings. In the drawings, like reference numerals have been used throughout to designate like elements. As used herein, the words "printer" and "imaging apparatus", which may be used interchangeably, encompasses any apparatus that performs a print outputting function for any purpose, such as a digital copier, bookmaking machine, facsimile machine, a multi-function machine, etc. Furthermore, a printer is an apparatus that forms images with marking material on media and fixes and/or cures the images before the media exits the printer for collection or further printing by a subsequent printer.

Figure 8:
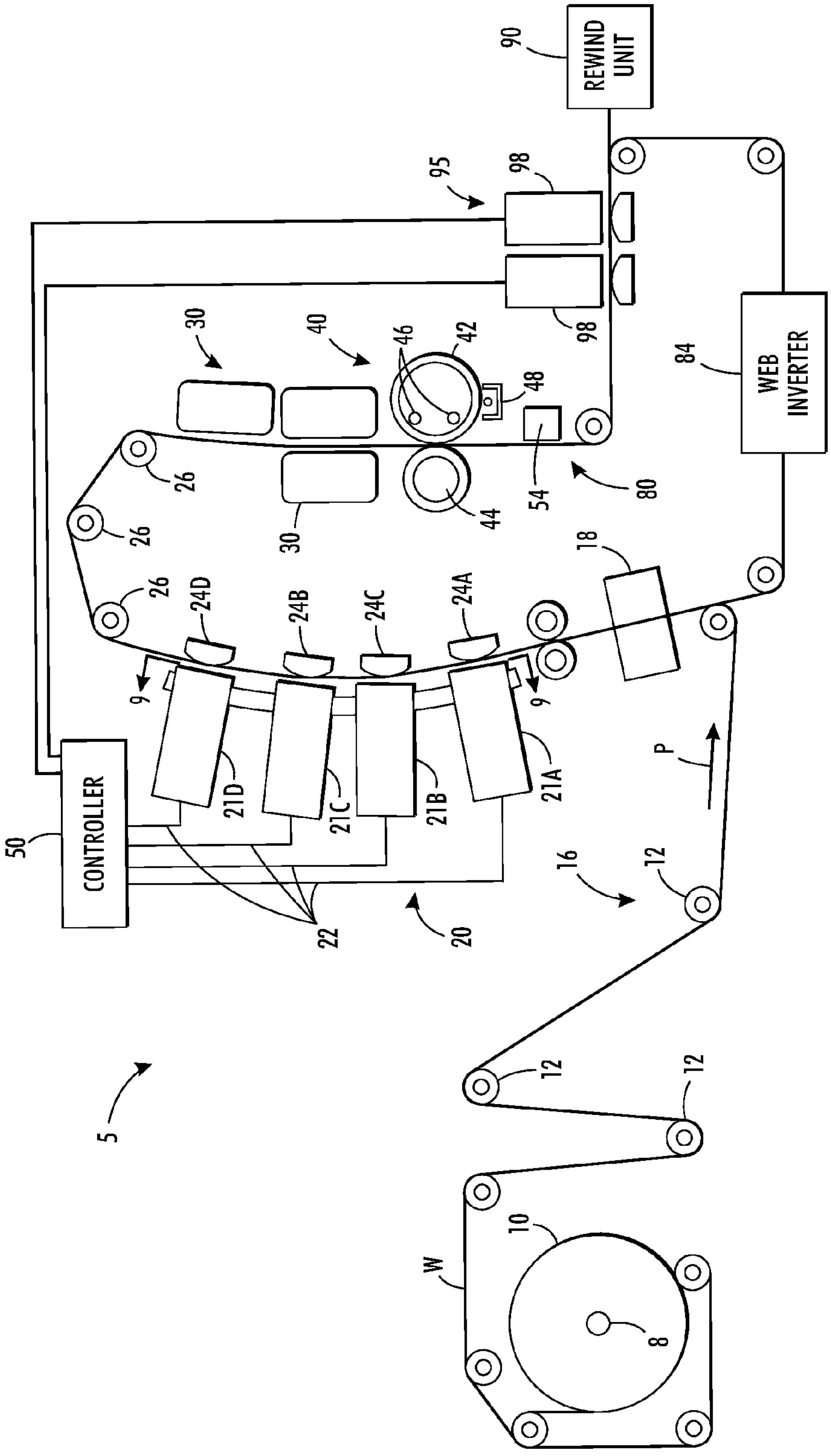
FIG. 8 PRIOR ART
FIG. 8 illustrates a block diagram of a prior art inkjet printing apparatus in which a system and method that compensates for defective inkjet ejectors may be used.

FIG. 8 depicts an imaging apparatus 5 that uses the method described in this document to compensate for missing, intermittent, or weak inkjets. The imaging apparatus 5 may implement a solid ink print process for printing onto a continuous media web. Although the system and method disclosed herein is most beneficial in imaging apparatus in which the recording media passes the printheads only once, the system and method may also be used in imaging apparatus in which multiple passes occur to form an image. Furthermore, while the system and method are discussed in the context of a solid ink imaging apparatus, they may be used with imaging apparatus that use other types of liquid ink, such as aqueous, emulsified, gel, UV curable inks, or inks having magnetic properties such as those used in magnetic ink character recognitions systems ("MICR"). Therefore, the system and method may be used in any imaging apparatus that provides liquid ink to one or more printheads, including cartridge inkjet systems.

The imaging apparatus 5 shown in FIG. 8 forms a printed image on media by ejecting ink droplets from a plurality of inkjets arranged in one or more printheads. During the course of printing, one or more of the inkjets may become unavailable to eject ink. The system described herein implements a method of image correction, which compensates for an unavailable inkjet by configuring a functional inkjet, referred to as a compensating inkjet, to eject ink in place of the unavailable inkjet. The system and method exclude defective inkjets from a search pattern that is used to select the compensating inkjet.

Referring to FIG. 8, an inkjet imaging apparatus 5 is shown that has been configured to enable electrical motors used to align printheads to be calibrated with reference to the sensitivity and backlash of the motors. For the purposes of this disclosure, the imaging apparatus is in the form of an inkjet printer that employs one or more inkjet printheads and an associated solid ink supply. However, the motor calibration methods described herein are applicable to any of a variety of other imaging apparatus that use electromechanical motors or other actuators to align the positions of printheads in the system.

The imaging apparatus 5 includes a print engine to process the image data before generating the control signals for the inkjet ejectors for ejecting colorants. Colorants may be ink, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

The direct-to-sheet, continuous-media, phase-change inkjet imaging apparatus 5 includes a media supply and handling system configured to supply a long (i.e., substantially continuous) web of media W of "substrate" (paper, plastic, or other printable material) from a media source, such as spool of media 10 mounted on a web roller 8. For simplex printing, the printer is comprised of feed roller 8, media conditioner 16, printing station 20, printed web conditioner 80, coating station 95, and rewind unit 90. For duplex operations, the web inverter 84 is used to flip the web over to present a second side of the media to the printing station 20, printed web conditioner 80, and coating station 95 before being taken up by the rewind unit 90. Duplex operations may also be achieved with two imaging apparatus 5 arranged serially with a web inverter interposed between them. In this arrangement, the first imaging apparatus forms and fixes an image on one side of a web, the inverter turns the web over, and the second imaging apparatus forms and fixes an image on the second side of the web. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 95 before being flipped by the inverter 84 and laterally displaced by a distance that enables the web to travel over the other half of the rollers opposite the printing station 20, printed web conditioner 80, and coating station 95 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, that rotate one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the imaging apparatus.

The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media is transported through a printing station 20 that includes a series of color units or modules 21A, 21B, 21C, and 21D, each color module effectively extends across the width of the media and is able to eject ink directly (i.e., without use of an intermediate or offset member) onto the moving media. The arrangement of printheads in the print zone of the system 5 is discussed in more detail with reference to FIG. 9. As is generally familiar, each of the printheads may eject a single color of ink, one for each of the colors typically used in color printing, namely, cyan, magenta, yellow, and black (CMYK). The controller 50 of the imaging apparatus receives velocity data from encoders mounted proximately to rollers positioned on either side of the portion of the path opposite the four printheads to calculate the linear velocity and position of the web as the web moves past the printheads. The controller 50 uses these data to generate timing signals for actuating the inkjet ejectors in the printheads to enable the printheads to eject four colors of ink with appropriate timing and accuracy for registration of the differently color patterns to form color images on the media. The inkjet ejectors actuated by the firing signals correspond to image data processed by the controller 50. The image data may be transmitted to the imaging apparatus, generated by a scanner (not shown) that is a component of the imaging apparatus, or otherwise generated and delivered to the imaging apparatus. An individual data element of the image data may be referred to as an image data value or as an image datum. In various possible embodiments, a color module for each primary color may include one or more printheads; multiple printheads in an module may be formed into a single row or multiple row array; printheads of a multiple row array may be staggered; a printhead may print more than one color; or the printheads or portions thereof can be mounted movably in a direction transverse to the process direction P, also known as the cross-process direction, such as for spot-color applications and the like.

Each of the color modules 21A-21D includes at least one electrical motor configured to adjust the printheads in each of the color modules in the cross-process direction across the media web. In a typical embodiment, each motor is an electromechanical device such as a stepper motor or the like. As used in this document, electrical motor refers to any device configured to receive an electrical signal and produce mechanical movement. Such devices include, but are not limited to, solenoids, stepper motors, linear motors, and the like. In a practical embodiment, a print bar actuator is connected to a print bar containing two or more printheads. The print bar actuator is configured to reposition the print bar by sliding the print bar in the cross-process direction across the media web. Printhead actuators may also be connected to individual printheads within each of color modules 21A-21D. These printhead actuators are configured to reposition an individual printhead by sliding the printhead in the cross-process direction across the media web.

The imaging apparatus may use "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. In one embodiment, the phase change ink melting temperature is approximately 70° C. to 140° C. In alternative embodiments, the ink utilized in the imaging device may comprise UV curable gel ink. Gel ink may also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each color module is a backing member 24A-24D, typically in the form of a bar or roll, which is arranged substantially opposite the printhead on the back side of the media. Each backing member is used to position the media at a predetermined distance from the printhead opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the printing station 20, the temperature of the media is maintained within a given range. Ink is ejected from the printheads at a temperature typically significantly higher than the receiving media temperature. Consequently, the ink heats the media. Therefore other temperature regulating devices may be employed to maintain the media temperature within a predetermined range. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the printheads of the printing station 20. Temperature sensors (not shown) may be positioned along this portion of the media path to enable regulation of the media temperature. These temperature data may also be used by systems for measuring or inferring (from the image data, for example) how much ink of a given primary color from a printhead is being applied to the media at a given time.

Following the printing station 20 along the media path are one or more "mid-heaters" 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 is configured to apply heat and/or pressure to the media to fix the images to the media. The term "fixing" may refer to the stabilization of ink on media through components operating on the ink and/or the media, including, but not limited to, fixing rollers and the like. Additionally or alternatively, the term "fixing" may refer to the stabilization of ink on media through environmental effects such as, but not limited to, evaporation and drying as in the case of aqueous ink, and the like. The fixing assembly 40 may include any suitable device or apparatus for fixing images to the media including heated or unheated pressure rollers, radiant heaters, heat lamps, and the like. In the embodiment of the FIG. 8, the fixing assembly includes a "spreader" 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web W to a temperature in a range from about 35° C. to about 80° C. In alternative embodiments, the fixing assembly may be configured to spread the ink using non-contact heating (without pressure) of the media after the print zone. Such a non-contact fixing assembly may use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi lbs/side. Lower nip pressure gives less line spread while higher pressure may reduce pressure roller life.

The spreader 40 may also include a cleaning/oiling station 48 associated with image-side roller 42. The station 48 cleans and/or applies a layer of some release agent or other material to the roller surface. The release agent material may be an amino silicone oil having viscosity of about 10-200 centipoises. Only small amounts of oil are required and the oil carried by the media is only about 1-10 mg per A4 size page. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

The coating station 95 applies a clear ink to the printed media. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 95 may apply the clear ink with either a roller or a printhead 98 ejecting the clear ink in a pattern. Clear ink for the purposes of this disclosure is functionally defined as a substantially clear overcoat ink that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain poly ethylene or poly methylene waxes. Similar to the colored phase change inks, clear phase change ink is substantially solid at room temperature and substantially liquid or melted when initially jetted onto the media. The clear phase change ink may be heated to about 100° C. to 140° C. to melt the solid ink for jetting onto the media.

Following passage through the spreader 40, the printed media may be wound onto a roller for removal from the system (simplex printing) or directed to the web inverter 84 for inversion and displacement to another section of the rollers for a second pass by the printheads, mid-heaters, spreader, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 5 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the electrical motor calibration function, described below. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Controller 50 may be operatively connected to the print bar and printhead motors of color modules 21A-21D in order to adjust the positions of the printhead bars and printheads in the cross-process direction across the media web. Controller 50 is further configured to determine sensitivity and backlash calibration parameters that are measured for each of the printhead and print bar motors, and to store these parameters in the memory. In response to the controller 50 detecting misalignment that requires movement of a print bar or printhead, controller 50 uses the calibration parameter corresponding to the required direction of movement for the appropriate motor to determine a number of steps that the controller commands the motor to rotate to achieve movement of the print bar or printhead in the required direction.

The imaging apparatus 5 may also include an optical imaging system 54 that is configured in a manner similar to that described above for the imaging of the printed web. The optical imaging system is configured to detect, for example, the presence, intensity, and/or location of ink drops jetted onto the receiving member by the inkjets of the printhead assembly. The optical imaging system may include an array of optical detectors/sensors mounted to a bar or other longitudinal structure that extends across the width of an imaging area on the image receiving member. In one embodiment in which the imaging area is approximately twenty inches wide in the cross process direction and the printheads print at a resolution of 600 dpi in the cross process direction, over 12,000 optical detectors are arrayed in a single row along the bar to generate a single scanline across the imaging member. The optical detectors are configured in association in one or more light sources that direct light towards the surface of the image receiving member. The optical detectors receive the light generated by the light sources after the light is reflected from the image receiving member. The magnitude of the electrical signal generated by an optical detector in response to light being reflected by the bare surface of the image receiving member is larger than the magnitude of a signal generated in response to light reflected from a drop of ink on the image receiving member. This difference in the magnitude of the generated signal may be used to identify the positions of ink drops on an image receiving member, such as a paper sheet, media web, or print drum. The reader should note, however, that lighter colored inks, such as yellow, cause optical detectors to generate lower contrast signals with respect to the signals received from unlinked portions than darker colored inks, such as black. Thus, the contrast may be used to differentiate between dashes of different colors. The magnitudes of the electrical signals generated by the optical detectors may be converted to digital values by an appropriate analog/digital converter. These digital values are denoted as image data in this document and these data are analyzed to identify positional information about the dashes on the image receiving member as described below.

Figure 9:
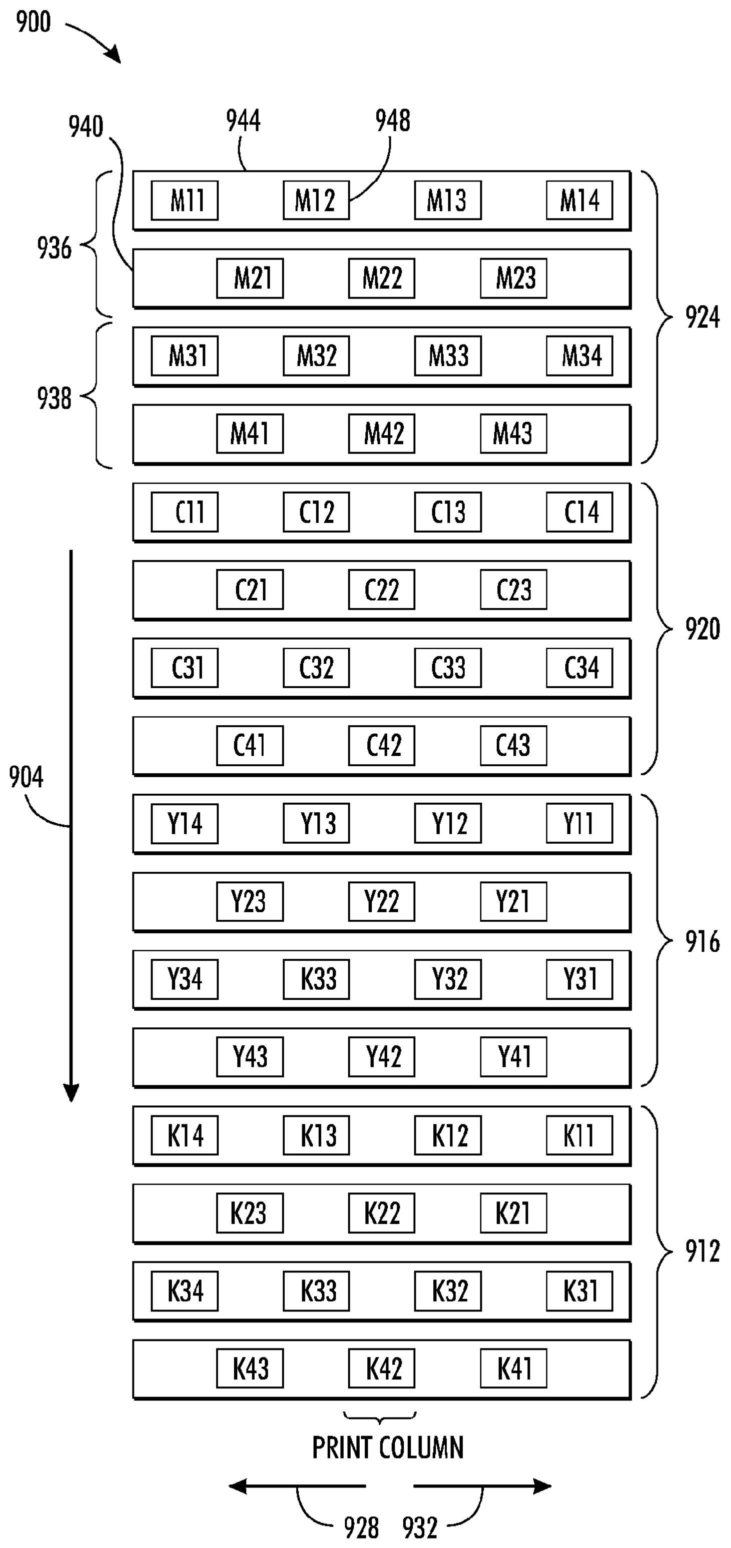
FIG. 9 PRIOR ART
FIG. 9 illustrates a schematic view of a prior art printhead configuration viewed along lines 9-9 in FIG. 8.

A schematic view of a prior art print zone 900 that may be used in the imaging apparatus 5 is depicted in FIG. 9. The print bars and printheads of this print zone may be moved for alignment purposes using the processes described below when the print bars and printheads are configured with actuators for movement of the print bars and printheads. The print zone 900 includes four color modules or units 912, 916, 920, and 924 arranged along a process direction 904. Each color unit ejects ink of a color that is different than the other color units. In one embodiment, color unit 912 ejects black ink, color unit 916 ejects yellow ink, color unit 920 ejects cyan ink, and color unit 924 ejects magenta ink. Process direction 904 is the direction that an image receiving member moves as travels under the color unit from color unit 924 to color unit 912. Each color unit includes two print arrays, which include two print bars each that carry multiple printheads. For example, the print bar array 936 of magenta color unit 924 includes two print bars 940 and 944. Each print bar carries a plurality of printheads, as exemplified by printhead 948. Print bar 940 has three printheads, while print bar 944 has four printheads, but alternative print bars may employ a greater or lesser number of printheads. The printheads on the print bars within a print bar array, such as the printheads on the print bars 940 and 944, are staggered to provide printing across the image receiving member in the cross process direction at a first resolution. The printheads on the print bars of the print bar array 936 within color unit 924 are interlaced with reference to the printheads in the print bar array 938 to enable printing in the colored ink across the image receiving member in the cross process direction at a second resolution. The print bars and print bar arrays of each color unit are arranged in this manner. One print bar array in each color unit is aligned with one of the print bar arrays in each of the other color units. The other print bar arrays in the color units are similarly aligned with one another. Thus, the aligned print bar arrays enable drop-on-drop printing of different primary colors to produce secondary colors. The interlaced printheads also enable side-by-side ink drops of different colors to extend the color gamut and hues available with the printer.

FIG. 1 represents a block diagram of a system 100 of the present disclosure that is configured to process image data in response to the detection of defective inkjets in a printhead, such as the printheads in the imaging apparatus 5 of FIG. 8. The system 100 includes a compensation processor 104 connected to an image data memory 108. The memory 108 is an electronic memory in which output image values are stored. As described above, the output image values, which represent a processed form of the image data, may be generated by the controller and are used to generate the printhead firing signals. As shown in FIG. 1, the memory 108 may store the output image values in an array/matrix. A single element of the array of output image values may be referred to herein as a datum or an image datum. The processor 104 processes the output image values stored in the memory 108 to detect the output image values that correspond to defective inkjets. Once the output image values corresponding to defective inkjets are detected, the processor 104 selects alternate output image value positions in which the image data values corresponding to the defective inkjets may be stored. In particular, the processor 104 may combine the datum corresponding to a defective inkjet with the datum corresponding to a functional inkjet, in response to the datum of the defective inkjet requiring the defective inkjet to eject ink. Additionally or alternatively, the datum corresponding to a defective inkjet may modify or replace the datum corresponding to a functional inkjet, in response to the datum of the functional inkjet requiring the functional inkjet not to eject a maximum number of drops of ink. The system 100 may be included within a controller, such as the controller 50 of FIG. 8, as programming instructions, hardware components, and/or related circuitry. Additionally or alternatively, the system 100 may be implemented separately from the controller 50 and electrically connected to the controller 50. For example, the system 100 may include a general purpose processor having an associated memory in which programmed instructions are stored. The system 100 may, alternatively, be an application specific integrated circuit or a group of electronic components configured on a printed circuit board. Thus, the system 100 may be implemented in hardware alone, software alone, or a combination of hardware and software.

Figure 2:
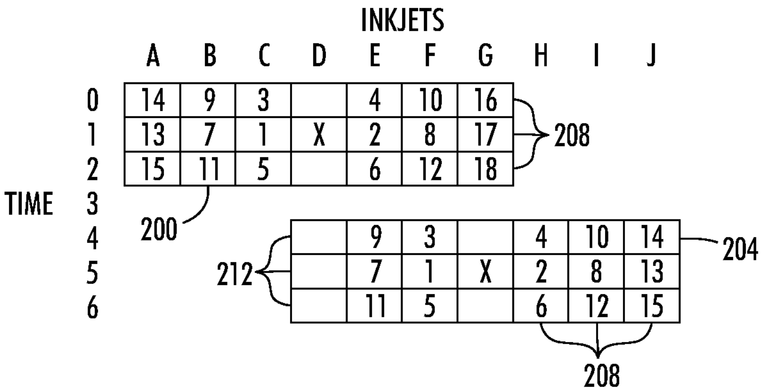
FIG. 2 illustrates two example search patterns used to select image data positions available for defective inkjet ejector compensation.

The processor 104 applies a search pattern to each defective position to search for proximally located functional positions. Two exemplary search patterns 200, 204 are illustrated in FIG. 2. The search patterns 200, 204 have been applied over an output image value array corresponding to the inkjets A-J and the time periods 0-6. For simplicity, the output image values are not shown. The positions corresponding to defective inkjets are indicated with an "X" in each of the FIGS. 2-6. Accordingly, the inkjets D and G in FIG. 2 have been identified as being defective and thus are unable to eject an ink drop at the times 1 and 5, respectively. Thus, the Xs mark what are referred to herein as "defective positions." Furthermore, the reader should understand that the data position itself is not defective; instead, the inkjet corresponding to the data position is defective.

The search pattern 200 encompasses a portion of the output image values that are searched by the system 100 to locate a compensating position that is suitable to accept the image value corresponding to the defective position X of inkjet D at the time 1. The numbered positions of each search pattern described herein are referred to as candidate positions 208 (numbered 1-18 in the search pattern 200). The output image values encompassed by the candidate positions of the search pattern may be referred to as candidate data. The unnumbered positions of the search patterns are not candidate positions 208, because these positions correspond to other positions that would be printed by the defective inkjet. The candidate positions 208 are prioritized, such that the system 100 begins the search for a compensating position with the candidate position 208 labeled as 1. For example, when applying the search pattern 200, the system 100 first looks to the data position corresponding to inkjet C at time 1. The system 100 then determines if inkjet C is scheduled to eject ink at time 1 and whether the magnitude of the image data corresponds to a maximum ink drop mass, i.e., the system 100 determines whether the image data in the data position can be modified. If the image data corresponds to the maximum ink drop mass, the system 100 progresses to the next candidate position 208 (i.e. position 2). If, however, the image data corresponds to an ink drop mass that is less than the maximum ink drop mass, then the system 100 may select the candidate position 208 labeled 1 as the compensating position. Accordingly, all or a portion of the image data stored at the defective position X (inkjet D, time 1 for the search pattern 200) is transferred to the compensating image data position, such that at the time 1 the inkjet C ejects all or a portion of the ink that would have been ejected by the inkjet D, if the inkjet D had been functional.

The system 100 selects a compensating position that corresponds to a functional inkjet. For example, selecting the candidate positions 16, 17, and 18 of the search pattern 200 is generally undesirable because these candidate positions 208 correspond to the defective inkjet G. Therefore, as shown in FIG. 2, upon detecting that the inkjet D is defective, the system 100 modifies the search pattern 204 for locating a functional inkjet capable of printing all or a portion of the image data for the inkjet G. Specifically, the system 100 has excluded the positions 212 in the column corresponding to the inkjet D as candidate positions 208 from the search pattern 204. Accordingly, the system 100 searches only the candidate positions 1-15 in the search pattern 204 for a compensating position, thereby assuring that the compensating position corresponds to a functional inkjet. As used herein a "column" of data or positions refers to an arrangement of data or positions corresponding to a particular inkjet ejector; a column of data or positions may be arranged vertically, horizontally, or in any another direction.

Figure 3:
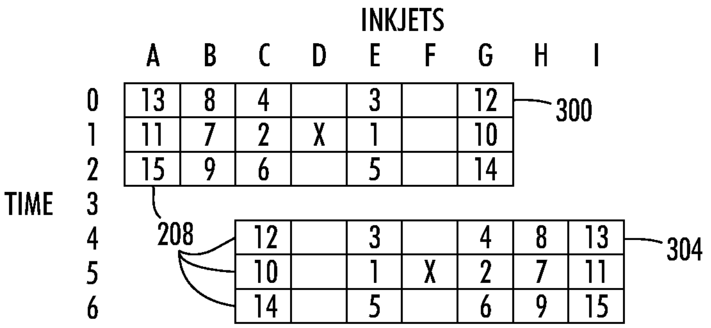
FIG. 3 illustrates two example search patterns used to select image data positions available for defective inkjet ejector compensation.

As shown in FIG. 3, the system 100 may be configured to utilize the search patterns 300, 304, which have been developed with reference to each other and are referred to as related search patterns. The system 100 has modified the search pattern 300 to exclude the positions of column F in response to detecting the defective inkjet that prints the image data located in column F. The system 100 has modified the search pattern 304 to exclude the positions of column D in response to detecting the defective inkjet located in column D. In one embodiment, the processor 104 may develop related search patterns 300, 304 when the defective inkjets (D and F in FIG. 3) are proximate to each other. Depending on the embodiment, defective inkjets may be proximate to each when the inkjets are separated by three or fewer functional inkjets. Additionally or alternatively, defective inkjets may be proximate to each other when a search pattern positioned about a defective position X includes one or more defective positions X from another defective inkjet. Search patterns developed with reference to each other may be most effective in the absence of an edge being defined by one of the defective inkjets.

The search patterns 300, 304 are described as being "related" because the order in which the system 100 progresses through the candidate positions 208 takes into account the proximity of the defective inkjets. For example, the candidate positions 208 of the search pattern 300 have been prioritized with reference to the defective position X of the search pattern 304, and the candidate positions 208 of the search pattern 304 have been prioritized with reference to the defective position X of the search pattern 300. Prioritization of the candidate positions 208 may result in the candidate positions located between the defective inkjets having a higher priority than the other candidate positions. Accordingly, the compensating position selected by each search pattern 300, 304 is more likely to correspond to an inkjet located between the defective inkjets.

Figure 4:
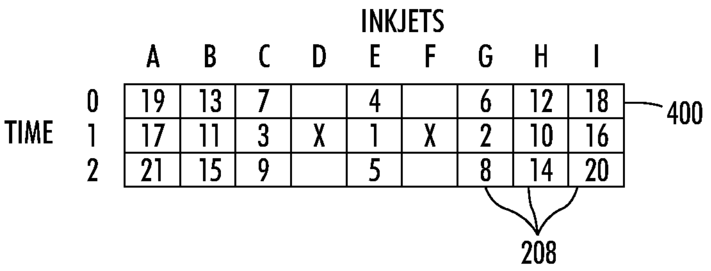
FIG. 4 illustrates an example of a combined search pattern used to select image data positions available for defective inkjet ejector compensation for a first and second defective inkjet ejector.

As shown in FIGS. 4, 5, 6 the processor 104 may utilize a single combined search pattern 400, 500, or 600 to search for one or more functional inkjets to print image data associated with two or more defective inkjets. The search patterns 400, 500, 600 may include candidate positions corresponding to inkjets located up to five inkjets away from a defective inkjet. As shown in FIG. 4, in response to detecting the defective inkjets D and F, the system 100 has modified the search patterns typically applied to each defective position X by generating a combined search pattern that is used for both defective positions X. The system 100 may modify the combined search pattern 400, 500, or 600 to exclude the positions that correspond to defective inkjets. Specifically, columns D and F of the search pattern 400, columns D and E of the search pattern 500, and columns E and F of the search pattern 600 have been excluded as these columns correspond to the defective inkjets detected in the search pattern. In one embodiment, the system 100 may develop combined search patterns when the defective inkjets are proximate to each other, as defined above, as well as when the defective inkjets are adjacent as in FIGS. 5 and 6. Combined search patterns may be most effective in the absence of an edge being defined by one of the defective inkjets.

The processor 104 may search the combined search pattern 400, 500, or 600 once for each defective position X about which the search pattern is positioned. For example, the processor 104 may search the combined search pattern 400 twice, in response to the two defective positions X, in order to find a candidate position for each defective position. The defective positions X included in the combined search pattern may correspond to different time values.

Figure 7:
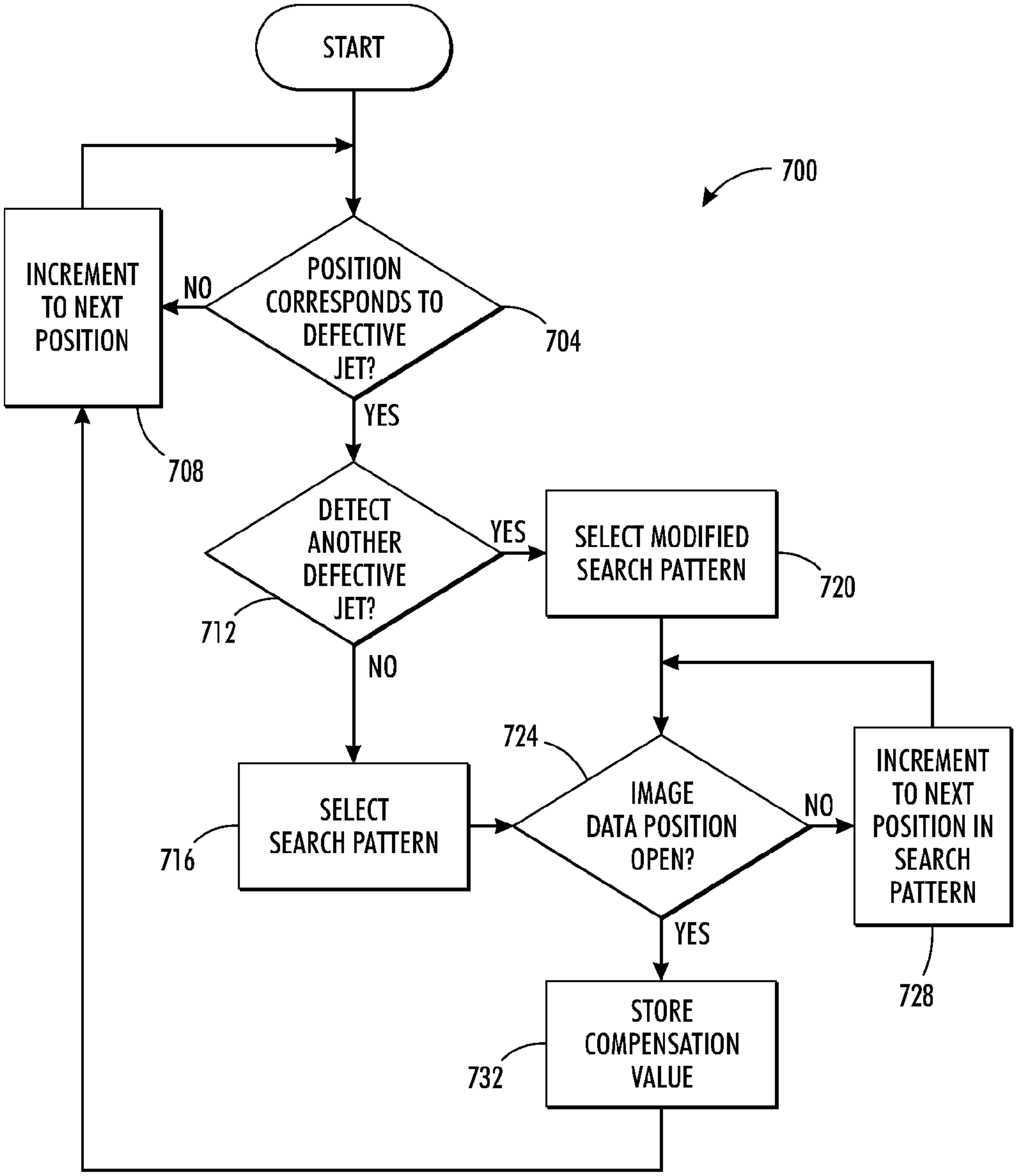
FIG. 7 illustrates a flowchart showing a method of compensating for defective inkjet ejectors in a printhead of an inkjet printing apparatus.

An image correction method 700 that compensates for output image values corresponding to defective inkjets is shown in FIG. 7. The method 700 begins with the processor 104 detecting whether a particular datum/position of the output image values corresponds to a defective inkjet (block 704). In general, most positions correspond to functional inkjets, in which case the processor 104 evaluates the next position (block 708). The system 100 may progress through the positions of the output image value matrix, row by row, column by column, or through any other sequence that considers the positions in the matrix in which an output image value is stored. Upon detecting a position that correspond to a defective jet, e.g. a defective position X, the processor 104 selects a compensating position. To select a compensating position the processor 104 begins by "positioning" a search pattern about the defective data position X. Next, the processor 104 identifies any positions encompassed by the search pattern that correspond to other defective positions X or defective inkjets (block 712). If the processor 104 detects no positions encompassed by the search pattern that correspond to other defective data positions or defective inkjets, the processor 104 utilizes the unmodified search pattern to identify the candidate position (block 716). If, however, one or more of the positions corresponds to a defective data position or a defective inkjet, the processor 104 modifies the search pattern and utilizes the modified search pattern to identity the compensating position (block 720). The processor 104 may modify the search pattern as described above and as illustrated in FIGS. 2-6. In particular, the processor 104 may exclude from the search pattern those positions that correspond to defective inkjets.

After a search pattern is selected, the processor 104 progresses through the candidate positions 208 to locate a compensating position (block 724). For example, in the search pattern 300 of FIG. 3, the processor 104 begins with the candidate position 208 labeled 1 and detects whether the image data stored in a position corresponds to the maximum ink drop mass. If the image data does not correspond to the maximum ink drop mass, the processor 104 may select the candidate position 208 labeled 1 as the compensating data position. If, however, the image data corresponds to the maximum ink drop mass, the processor 104 may consider the next candidate position 208 in the sequence of candidate positions (block 728).

Upon selecting a compensating position, the processor 104 reconfigures the output image value corresponding to the defective position and corresponding to the compensating position. In particular, the output image value previously stored by the memory 108 in the defective position X is deleted from the defective position and stored in the compensating position to prevent the defective inkjet from receiving a firing signal (block 732).

The methods disclosed herein may be implemented by a processor being configured with instructions and related circuitry to perform the methods. Additionally, processor instructions may be stored on computer readable medium so they may accessed and executed by a computer processor to perform the methods for distributing compensation image values to image data positions located around an image data position corresponding to a defective inkjet.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for image correction to compensate for at least one defective inkjet ejector in a printer comprising:

selecting a first datum stored in an array of image data, the first datum corresponding to a first defective inkjet ejector;

detecting a second datum stored in the array of image data, the second datum corresponding to a second defective inkjet ejector and being within a search pattern positioned about the first datum;

modifying the search pattern positioned about the first datum with reference to a search pattern positioned about the second datum in response to detection of the second datum being within the search pattern positioned about the first datum;

identifying a third datum stored in the array of image data and being within the modified search pattern positioned about the first datum, the third datum corresponding to a first functional inkjet ejector capable of ejecting ink corresponding to at least a portion of the first datum;

modifying the third datum with reference to the first datum; and operating the first functional inkjet ejector with reference to the modified third datum to compensate for the first defective inkjet ejector being unable to eject ink corresponding to the first datum;

modifying the search pattern positioned about the second datum with reference to the search pattern positioned about the first datum, the search pattern positioned about the first datum including a first plurality of candidate data of the array of image data, the search pattern positioned about the second datum including a second plurality of candidate data of the array of image data;

identifying a fourth datum stored in the array of image data and being within the modified search pattern positioned about the second datum, the fourth datum corresponding to a second functional inkjet ejector;

modifying the fourth datum with reference to the second datum; and operating the second functional inkjet ejector with reference to the modified fourth datum to compensate for the second defective inkjet ejector being unable to eject ink corresponding to the second datum; and prioritizing the second plurality of candidate data with reference to the first datum and the second datum, such that the candidate data of the second plurality of candidate data positioned between the first datum and the second datum receives a higher priority than the other candidate data of the second plurality of candidate positions.

2. The method for image correction of claim 1, further comprising:

excluding the first datum corresponding to the first defective inkjet ejector from the array of image data.

3. The method for image correction of claim 1, wherein:

the search pattern positioned about the first datum includes a plurality of candidate data of the array of image data, and the modifying of the search pattern positioned about the first datum comprises excluding the second datum from the plurality of candidate data.

4. The method for image correction of claim 1, the modifying of the search pattern positioned about first datum comprising:

combining the search pattern positioned about the first datum with a search pattern positioned about the second datum to form a combined search pattern.

5. The method for image correction of claim 4, further comprising:

excluding the first datum corresponding to the first defective inkjet ejector from a plurality of candidate data of the array of image data included by the combined search pattern;

excluding the second datum corresponding to the second defective inkjet ejector from the plurality of candidate data of the array of image data included by the combined search pattern;

identifying a fourth datum from the plurality of candidate data of the array of image data included by the combined search pattern, the fourth datum corresponding to a second functional inkjet ejector;

modifying the fourth datum with reference to the second datum; and operating the second functional inkjet ejector with reference to the modified fourth datum to compensate for the second defective inkjet ejector being unable to eject ink corresponding to the second datum.

6. The method for image correction of claim 4, the first defective inkjet ejector being adjacent to the second defective inkjet ejector.

7. The method for image correction of claim 1, the first functional inkjet ejector capable of ejecting ink corresponding to at least a portion of the first datum being positioned up to five inkjet ejectors away from the first defective inkjet ejector.

8. The method for image correction of claim 1, wherein:

the search pattern positioned about the first datum includes a plurality of candidate data of the array of image data, and the modification of the search pattern positioned about the first datum further comprises:

excluding the candidate data associated with the second defective inkjet ejector from the plurality of candidate data of the search pattern.

9. The method for image correction of claim 8, the modifying of the search pattern positioned about the first datum further comprising:

prioritizing the plurality of candidate data with reference to the first datum and the second datum.

10. A system for image correction to compensate for at least one defective inkjet ejector in a printer comprising:

an image data memory configured to store an array of image data; and a processor configured (i) to select a first datum stored in the array of image data, the first datum corresponding to a first defective inkjet ejector, (ii) to detect a second datum stored in the array of image data, the second datum corresponding to a second defective inkjet ejector and being within a search pattern positioned about the first datum, (iii) to modify the search pattern positioned about the first datum by combining the search pattern positioned about the first datum with a search pattern positioned about the second datum to form a combined search pattern in response to detection of the second datum being within the search pattern positioned about the first datum, (iv) to identify a third datum stored in the array of image data and being within the combined search pattern positioned about the first datum, the third datum corresponding to a first functional inkjet ejector capable of ejecting ink corresponding to at least a portion of the first datum, (v) to modify the third datum with reference to the first datum, (vi) to operate the first functional inkjet ejector capable of ejecting ink corresponding to at least a portion of the first datum with reference to the modified third datum to compensate for the first defective inkjet ejector being unable to eject ink corresponding to the first datum, (vii) to exclude the first datum corresponding to the first defective inkjet ejector from a plurality of candidate data of the array of image data included by the combined search pattern, (viii) to exclude the second datum corresponding to the second defective inkjet ejector from the plurality of candidate data of the array of image data included by the combined search pattern, (ix) to identify a fourth datum from the plurality of candidate data of the array of image data included by the combined search pattern, the fourth datum corresponding to a second functional inkjet ejector, (x) to modify the fourth datum with reference to the second datum, and (xi) to operate the second functional inkjet ejector with reference to the modified fourth datum to compensate for the second defective inkjet ejector being unable to eject ink corresponding to the second datum; and prioritizing the second plurality of candidate data with reference to the first datum and the second datum, such that the candidate data of the second plurality of candidate data positioned between the first datum and the second datum receives a higher priority than the other candidate data of the second plurality of candidate positions.

11. The system for image correction of claim 10, wherein:

the search pattern positioned about the first datum includes a plurality of candidate data of the array of image data, and the modification of the search pattern positioned about the first datum comprises excluding the second datum from the plurality of candidate data.

12. The system for image correction of claim 10, wherein:

the search pattern positioned about the first datum includes a plurality of candidate data of the array of image data, and the modification of the search pattern positioned about the first datum includes prioritizing the plurality of candidate data with reference to the first datum and the second datum.

13. The system for image correction of claim 10, the first defective inkjet ejector being adjacent to the second defective inkjet ejector.

14. The system for image correction of claim 10, the first functional inkjet ejector capable of ejecting ink corresponding to at least a portion of the first datum being positioned up to five inkjet ejectors away from the first defective inkjet ejector.

15. The system for image correction of claim 10, wherein:

the search pattern positioned about the first datum includes a plurality of candidate data of the array of image data, and the modification of the search pattern positioned about the first datum further comprises:

excluding the candidate data associated with the second defective inkjet ejector from the plurality of candidate data of the search pattern.

* * * * *